United States Patent Office 3,556,949
Patented Jan. 19, 1971

3,556,949
RECOVERY OF WATER FROM URINE BY CHROMIUM ION TREATMENT AND DISTILLATION
David F. Putnam, Granville, Mass., and Sid Russell, Suffield, and Philip Birbara, Hazardville, Conn., assignors to United Aircraft Corporation, East Hartford, Conn., a corporation of Delaware
No Drawing. Filed Oct. 19, 1964, Ser. No. 404,954
Int. Cl. B01d 3/34; C23f 11/00, 14/00
U.S. Cl. 203—6                                16 Claims More than 140 different substances are found in urine. These substances may be broadly categorized as electrolytes, nitrogenous substances, vitamins, metabolites, and hormones. Seventy percent of the total weight of these materials is accounted for by just two components, urea (50%) and sodium chloride (20%). A breakdown which lists the ten most abundant components of urine is presented in Table I.

TABLE I.—MAJOR CONSTITUENTS OF URINE

| Constituent | Formula | Concentration in urine, mg./l. | Relative weight, percent |
|---|---|---|---|
| Urea | $H_2NCONH_2$ | 23,800 | 50. |
| Sodium chloride | NaCl | 9,540 | 20. |
| Sodium | Na | 3,180 | 6.7 |
| Potassium | K | 1,590 | 3.3 |
| Creatinine | $C_4H_7N_3O$ | 954 | 2.0 |
| Phosphorus | P | 875 | 1.8 |
| Sulfur | S | 794 | 1.7 |
| Ammonia | $NH_3$ | 555 | 1.2 |
| Hippuric acid | $C_6H_5CONHCH_2CO_2H$ | 555 | 1.2 |
| Uric acid | $C_5H_4N_4O_3$ | 555 | 1.2 |
| Other | | 5,202 | 10.9 |
| Total | | 47,600 | 100.0 |

ABSTRACT OF THE DISCLOSURE

An improved method of extracting potable water from urine by distillation is provided in which urine is pretreated prior to distillation with a urine soluble hexavalent chromium compound alone or in combination with a urine soluble sulfate compound.

This invention relates to extraction of potable water from urine by distillation.

The present invention is mainly concerned with the reclamation of potable water from urine in closed circuit survival systems, e.g., in space vehicles and the like. The main purpose of extracting water from urine in such systems is to reduce the requirement for expendable supplies. Since the human water requirement is substantial, complete reclamation of water from urine would considerably reduce the requirement for stored water in such systems.

The cost of water reclamation from urine must however be considered in determining the feasibility of resorting to such extraction. In general, this cost may be calculated in terms of equivalent weight, which figure includes the actual system weight plus the incremental weight contributed by the components required for water extraction, such as power supply and heat rejection, and the equivalent expendable weight, which would include materials entering into urine distillation process, e.g., the chemicals consumed in pretreatment.

It is one of the goals of this invention to extract potable water from urine in as efficient a manner as possible from an equivalent weight standpoint.

Another object of the invention is to provide processes for pretreating urine prior to distillation to improve the potability of the extracted distillate.

Other objects of this invention will in part by obvious and will in part appear hereinafter.

The extraction of potable water from urine in accordance with this invention involves the following three primary steps: (1) predistillation chemical treatment; (2) distillation; and (3) distillate sterilization.

It is with the first of these steps, i.e., chemical pretreatment, that the instant invention is especially concerned.

It is possible by one mechanism or another for all of these materials to appear as contaminants in urine distillate. In practice, however, it has been found that only a few components are troublesome.

According to this invention it has been discovered that contamination of the distillate by troublesome ingredients of the type described may be substantially avoided by pretreating the urine with small effective amounts of water soluble hexavalent chromium compounds alone or in combination with water soluble sulfate compounds, said compounds being soluble in urine.

Such chemical pretreatment serves to substantially prevent or minimize: (1) distillation of dissolved gases such as ammonia and unidentified odoriferous substances which, upon distillation, redissolve in the distillate and contaminate the same; and (2) decomposition of salts such as urea, ammonium carbonate and other urine solutes to gases which are liberated during evaporation and redissolve in the distillate as contaminants.

The chemical pretreatment of this invention is highly efficient from an equivalent weight standpoint.

The composition of urine given in Table I is merely illustrative, since it will be appreciated, urine specimens will vary from individual to individual.

For example, the free ammonia content of randomly sampled urine varies from about 400 to 600 milligrams per liter (mg./l.).

It has been found that if no preventive action is taken in a urine distillation system, the 400 to 600 mg./l. or so of ammonia, generally present as the carbonate or bicarbonate salt, is transported, together with the liberated carbon dioxide and watervapor, from the system evaporator to its condenser. In the condenser, most of the ammonia and carbon dioxide are dissolved in the relatively pure condensed water, thereby causing serious contamination of the distillate.

The hexavalent chromium compounds and sulfate compounds described herein, react with the ammonium ion to form relatively stable ammonium salts. By the phrase, "stable ammonium salt," is meant a salt which undergoes virtually no thermal decomposition and hence evolves virtually no ammonia during distillation at moderate temperatures, i.e., temperatures up to 150° F. Pretreatment of urine with these described chemicals, accordingly, prevents evolution of the ammonia content of the urine during distillation.

In addition to free ammonia, Table I reveals that urine contains urea as a major constituent. Urea, in an acidic aqueous solution, decomposes to ammonium carbonate at temperatures above approximately 150° F., viz.:

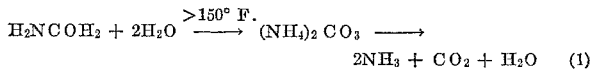
$$H_2NCOH_2 + 2H_2O \xrightarrow{>150°\,F.} (NH_4)_2CO_3 \longrightarrow$$
$$2NH_3 + CO_2 + H_2O \quad (1)$$

When urine is distilled at temperatures above 150° F., virtually all of the urea decomposes in this fashion and rather large amounts (e.g., up to 13,500 mg./l.) of ammonia appear in the condensate. This ammonia could be chemically fixed in the evaporator by addition of the described chemicals herein. However, because of the large amount involved, chemical fixing of ammonia from decomposed urea is unsound in many situations, such as closed circuit survival systems. It is therefore advisable to avoid thermal decomposition in such systems. Since urea is sufficiently stable below 150° F., this result may be accomplished by operating the distillate system below 150° F.

Urea also decomposes in the presence of the enzyme urease. This enzyme is produced by certain bacteria. Once introduced to urine, these bacteria multiply very rapidly and will within a short time, e.g., 12 to 48 hours, decompose most of the urea. Characteristically, as bacteria work, the urine gradually becomes basic and evolves ammonia according to the equation

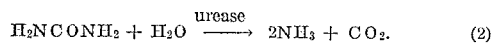
$$H_2NCONH_2 + H_2O \xrightarrow{urease} 2NH_3 + CO_2. \quad (2)$$

It has been found that efforts to halt this process by preventing the ingress of bacteria to urine is futile.

The hexavalent chromium compounds of this invention however effect a poisoning which converts urine to an ineffective bacteria culturing medium, and in effect renders the urine sterile to bacterial growth. It has also been found that hexavalent chromium acts as an oxidizer to destroy essential organic molecules which are present in the bacterial cells. Hexavalent chromium then is bifunctional in its prevention of bacterial decomposition of urea, since in addition to being highly toxic to bacterial growth by virtue of the heavy metal ion, it also acts as an oxidizer to destroy bacterial cells.

The chromium compounds of this invention also perform an oxidizing function to break up many odoriferous volatile molecules or otherwise alter them to non-volatile or non-odoriferous forms, thereby serving to maintain such volatiles, including the odor emanating therefrom, at a low level. Even so, however, a low level residual odor will ordinarily permeate a distillate even after oxidation of the urine. In order to effect complete removal of this odor, the distillate vapors may be passed through an activated charcoal bed. Alternately, the final odor may be removed by flowing the distillate through activated charcoal.

Although hexavalent chromium by itself is sufficient to: (1) fix ammonia; (2) sterilize the urine; (3) oxidize odoriferous volatiles; and (4) maintain urine pH greater than 2, or between about 2 and 7, there are some disadvantages connected with the use thereof.

For example, hexavalent chromium compounds tend to form a precipitate upon standing in urine for a period of several days which is believed to be $Cr(OH)_3$ and to result from the reduction of hexavalent chromium to its trivalent state.

Such precipitate formation is not desirable in many situations, such as closed circuit survival systems in space because it increases the chemical and hence the weight requirements of the system, and also reduces chemical efficiency. Further, solid precipitates in the evaporator tend to clog or otherwise hamper smooth operation of the distillation equipment.

It has further been discovered however that precipitate formation may be avoided by maintaining the concentration of hexavalent chromium below that required to stoichiometrically react with the ammonia present in the urine, and to fix with sulfate the ammonia not fixed with chromium.

In general, to prevent precipitation, the chromium content should be kept below about 4 g./l. and preferably below about 1 g./l., calculated as $CrO_3$. For best results, the chromium content will be maintained below about 0.4 g./l., calculated as $CrO_3$.

These amounts of hexavalent chromium are sufficient to accomplish sterilization and oxidation but not enough to accomplish fixing of the free ammonia. In this embodiment, accordingly, fixing of ammonia is accomplished by sulfate compounds, preferably sulfuric acid.

Some hexavalent chromium compounds, such as chromium trioxide, when added to urine, react with ammonium salts present therein in accordance with the following equation

$$(NH_4)_2CO_3 + CrO_3 \rightarrow (NH_4)_2CrO_4 + CO_2 \quad (3)$$

Sulfuric acid also reacts with the ammonium salts to form a stable ammonium salt in accordance with the equation

$$(NH_4)_2CO_3 + H_2SO_4 \rightarrow (NH_4)_2SO_4 + H_2O + CO_2 \quad (4)$$

The released carbon dioxide shown in these equations remains dissolved in the urine until evaporation increases the solute concentration thereof to the limit for carbon dioxide, at which point it begins to outgas.

There are of course side reactions and other equilibriums besides those indicated when sulfuric acid and chromium trioxide are added to urine. The reactions shown are however the ones which predominate.

The stoichiometric weights of the reactants in these equations are shown below in Table II.

TABLE II.—STOICHIOMETRIC QUANTITIES OF CHEMICALS TO FIX AMMONIA

| Chemical formula to fix two moles of $NH_3$ | Formula wt. | Weight of formula per unit weight of $NH_3$ | Moles of water consumed by the reaction |
|---|---|---|---|
| $H_2SO_4$ | 98.1 | 2.89 | −1 |
| $CrO_3$ | 100.0 | 2.94 | 0 |

It will be noted from Table II and Equation 4 that one of the advantages accruing from use of $H_2SO_4$ as the ammonia fixer resides in the fact that one mole of water is produced in the reaction.

Experiments with $H_2SO_4$ establish that the stoichiometric quantity indicated in Equation 4 and Table II is satisfactory for fixing $NH_3$ in urine. This fact indicates a lack of side reactions or other deviations from the reaction shown in Equation 4.

Although the amount of sulfate ($SO_4^-$) ion added to the urine will range up to 4 g./l. or even higher, usually about 1–2 grams of sulfate ion per liter will suffice to fix ammonia.

Experiments have also shown that 0.4 g./l. of $CrO_3$ is a sufficient oxidizer and germicide. When the combination of 1.6 g./l. $H_2SO_4 + 0.4$ g./l. $CrO_3$ is used, there is no precipitate; and none develops in time as it does with 4 g./l. $CrO_3$. This makes the treated urine easier to handle in that feed systems are less subject to clogging. $CrO_3$ is practically insoluble in concentrated $H_2SO_4$ (95–98 weight percent). However, if dissolved first in water, it may then be dissolved in the $H_2SO_4$. Example 1 below gives the formula of an aqueous solution which combines the $H_2SO_4$ and $CrO_3$ in the proper ratio for efficient urine pretreatment.

EXAMPLE 1

|  | Percent by weight |
|---|---|
| $H_2SO_4$ (95–98 weight percent) | 44.7 |
| $H_2O$ | 44.3 |
| $CrO_3$ | 11.0 |
| Specific Gravity | 1.44 |

This solution is slightly subsaturated at room temperature. The quantity required for adequate pretreatment is about 3.6 g./l.

Although chromium trioxide is preferred for use, any urine soluble hexavalent chromium compound capable of reacting with ammonia to form an ammonium compound which is stable at temperatures up to 150° F. may be used. Other than this, the important point so far as the chromium compound is concerned is that it contain hexavalent chromium.

Although sulfuric acid is preferred as the sulfate compound, here again, any urine soluble sulfate compound capable of reacting with ammonia to form an ammonium compound which is stable below 150° F. may be used. Other than this, the important point to emphasize on the sulfate compound is that it supply the urine with dissolved sulfate ions.

For best results, the pH of urine should be maintained between about 2 and 7, preferably between 2 and 5. When stoichiometric amounts of the chemicals described herein are added to urine, the pH of the system equilibrates between 3 and 5. For acids and acid salts, if greater than stoichiometric amounts are added, the hydrogen ion concentration rises.

Since urine contains about 1 percent sodium chloride, some small component of HCl will always exist in the solution. When an acid is added, the hydrogen ion concentration increases together with the HCl level. Since HCl is relatively volatile, some fraction of that present in urine volatilizes during a distillation process and is absorbed into the product water. In order to maintain a low chloride concentration and a pH of greater than 4 in the distillate, the pH of the treated urine should be maintained above 2.

In the last column of Table II, the amount of water which is produced or consumed in each reaction is listed. Both the formula weight and the consumption of water are penalties which must be considered when evaluating chemical pretreatment from an equivalent weight standpoint.

As has been stated above, for most efficient results from an equivalent weight standpoint, the temperature of the treated urine should be maintained below 150° F.

The nature of this invention will be made more clear by the following examples which should be treated as illustrative rather than limiting:

EXAMPLE 2

Urine having the approximate composition of that reported in Table I was treated with 4 grams per liter of chromium trioxide and then distilled by air evaporation at about 140° F. The resulting fresh distillate had a total bacteria count of zero (0) per milliliter tested in accordance with Standard Methods for the Examination of Water and Waste Water, American Public Health Association, Inc., 1960, and was highly potable.

EXAMPLE 3

Fresh urine having the approximate composition reported in Table I was treated with 3.6 grams per liter of the solution of sulfuric acid and chromium trioxide described in Example 1. Distillation was carried out by air evaporation at about 140° F. The resulting distillate had a total bacteria count of zero (0) per milliliter when tested in accordance with the standards described under Example 2.

A comparison of this urine distillate and USPHS drinking water standards is given below in Table III.

TABLE III.—COMPARISON OF URINE DISTILLATE AND USPHS DRINKING WATER STANDARDS

| Item | Urine distillate | USPHS standards |
|---|---|---|
| Total solids, mg./l | 2–30 | <500 |
| Turbidity units | 0–2 | <5 |
| Color units | 0–2 | <15 |
| Threshold odor number | 0–1 | <3 |

Although the distillation procedures described herein produce water from the chemically pretreated urine which has a total bacterial count of zero (0) per milliliter when tested in accordance with the standards reported in Example 2, after 2–3 days of exposure to the atmosphere, it has been found that the bacteria count of the distillate can increase to undesirable levels. This phenomena is not peculiar to urine distillates. As a matter of fact, untreated tap water as well as untreated well water will increase in bacteria count upon standing in a stagnant condition. Accordingly, if the distillates described herein are stored for any period of time following extraction, it is advisable to provide for continued sterilization. This may be done in a variety of ways. For example, chemical sterilizers, such as ozone or chlorine, could be added to the distillate. Alternatively, sterilization by radiation, filtration or pasturization techniques may be resorted to.

The invention in its broader aspects is not limited to the specific methods, products and compositions described but departures may be made therefrom within the scope of the accompanying claims without departing from the principles of the invention and without sacrificing its chief advantages.

What is claimed:

1. In a method of extracting potable water from urine by distillation, the improvement which comprises pretreating the urine prior to distillation with a hexavalent chromium compound which is soluble in urine.

2. The method of claim 1 wherein the hexavalent chromium compound is chromium trioxide.

3. In a method of extracting potable water from urine by distillation, the improvement which comprises pretreating the urine prior to distillation with a hexavalent chromium compound and a sulfate compound, said compounds being soluble in urine.

4. The method of claim 1 wherein the amount of hexavalent chromium compound utilized is, by weight, calculated as $CrO_3$, about 2.94 parts per part of free ammonia present in the urine.

5. The method of claim 3 wherein the amount of hexavalent chromium compound utilized is sufficient to sterilize the urine to bacterial growth.

6. The method of claim 3 wherein the amount of sulfate compound utilized is, by weight, calculated as $H_2SO_4$, about 2.89 parts per part of free ammonia present in the urine.

7. The method of claim 3 wherein the amount of hexavalent chromium compound is insufficient to form a precipitate upon standing in the urine.

8. The method of claim 3 wherein the hexavalent chromium compound is chromium trioxide.

9. The method of claim 3 wherein the sulfate compound is sulfuric acid.

10. The method of claim 3 wherein the urine is pretreated with about 0.4 g./l. of $CrO_3$ and about 1.6 g./l. of sulfuric acid.

11. The method of claim 3 wherein the urine is pretreated with about 3.6 g./l. of an aqueous solution comprising about 44.7% $H_2SO_4$, 44.3% $H_2O$, and 11.0% $CrO_3$.

12. In a method of distilling urine to extract potable water, the improvement which comprises dissolving in the urine prior to distillation hexavalent chromium ion to reduce the odoriferous volatiles.

13. In a method of distilling urine to extract potable water, the improvement which comprises dissolving in the urine hexavalent chromium ion to prevent bacterial decomposition of urea to ammonia.

14. In a method of distilling urine to extract potable water, the improvement which comprises dissolving in the urine hexavalent chromium ion to fix the free ammonia to thereby prevent its distillation.

15. In a method of distilling urine to extract potable water, the improvement which comprises dissolving in the urine hexavalent chromium ion and sulfate ion to fix free ammonia and thereby prevent its distillation.

16. A method of extracting potable water from urine which comprises dissolving a hexavalent chromium ion in the urine to prevent bacterial decomposition of the urine to ammonia, distilling the resulting mixture and collecting and sterilizing the water distillate.

References Cited

UNITED STATES PATENTS

| | | | |
|---|---|---|---|
| 830,069 | 9/1906 | Heber | 203—31 |
| 3,127,243 | 3/1964 | Konikoff | 203—11 |
| 3,242,058 | 3/1966 | Ganky et al. | 203—10 |

OTHER REFERENCES

Practical Physiological Chemistry: P. B. Hawk et al. 1947, publ., Phil. Pa.; The Blakiston Co. (pp. 747 and 748 relied upon).

Handbook of Dangerous Materials: N. I. Sax, 1951, N.Y. Reinhold Publ. Co. (pp. 102 and 103 relied upon).

WILBUR L. BASCOMB, JR., Primary Examiner